US012645187B2

(12) United States Patent
Joo et al.

(10) Patent No.: US 12,645,187 B2
(45) Date of Patent: Jun. 2, 2026

(54) ANTI-JAMMING TIME SYNCHRONIZATION METHOD AND APPARATUS FOR MAINTAINING TIME SYNCHRONIZATION BETWEEN GLOBAL POSITIONING SYSTEM AND SATELLITE-BASED AUGMENTATION SYSTEM

(71) Applicant: ELECTRONICS AND TELECOMMUNICATIONS RESEARCH INSTITUTE, Daejeon (KR)

(72) Inventors: Inone Joo, Sejong-si (KR); Cheon Sig Sin, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 360 days.

(21) Appl. No.: 18/402,023

(22) Filed: Jan. 2, 2024

(65) Prior Publication Data

US 2024/0264315 A1 Aug. 8, 2024

(30) Foreign Application Priority Data

Feb. 2, 2023 (KR) ........................ 10-2023-0014421

(51) Int. Cl.
*G04R 20/02* (2013.01)

(52) U.S. Cl.
CPC .................................... *G04R 20/02* (2013.01)

(58) Field of Classification Search
CPC ................................ G04R 20/02; G01S 19/14
See application file for complete search history.

(56) References Cited

U.S. PATENT DOCUMENTS

| | | | | |
|---|---|---|---|---|
| 2006/0238418 | A1* | 10/2006 | Monnerat | G01S 19/258 342/357.45 |
| 2013/0307724 | A1 | 11/2013 | Kim et al. | |
| 2014/0002303 | A1 | 1/2014 | Sin et al. | |
| 2014/0085154 | A1* | 3/2014 | Nagahama | G01S 19/14 343/720 |

(Continued)

FOREIGN PATENT DOCUMENTS

| | | | |
|---|---|---|---|
| JP | 2008209248 | A | 9/2008 |
| JP | 2022112022 | A | 8/2022 |

(Continued)

*Primary Examiner* — Sean Kayes
(74) *Attorney, Agent, or Firm* — Rabin & Berdo, P.C.

(57) ABSTRACT

An anti-jamming time synchronization method and apparatus for maintaining time synchronization between a global positioning system (GPS) and a satellite-based augmentation system (SBAS) are provided. The anti-jamming time synchronization method includes receiving a GPS signal from a GPS satellite using an omnidirectional antenna, receiving an SBAS signal from an SBAS satellite using a directional antenna, calculating measurement values of the GPS signal and the SBAS signal, decoding a GPS message of the GPS signal and an SBAS message of the SBAS signal, when the measurement values are values within a normal range, synchronizing time with GPS time based on a measurement value of the GPS signal and the GPS message, and when the measurement values are values beyond the normal range, synchronizing time with the GPS time based on a measurement value of the SBAS signal and the SBAS message.

19 Claims, 6 Drawing Sheets

(56) References Cited

U.S. PATENT DOCUMENTS

| | | | | |
|---|---|---|---|---|
| 2014/0086026 | A1* | 3/2014 | Mitani | G04R 60/08 368/278 |
| 2014/0087678 | A1 | 3/2014 | Yun et al. | |
| 2016/0161920 | A1* | 6/2016 | Fujisawa | G04G 17/04 368/80 |
| 2021/0072707 | A1 | 3/2021 | Hisashima et al. | |
| 2023/0007443 | A1* | 1/2023 | Moon | G01S 5/02213 |
| 2023/0013042 | A1* | 1/2023 | Moon | H04W 64/00 |

FOREIGN PATENT DOCUMENTS

| | | | |
|---|---|---|---|
| KR | 101415067 | B1 | 7/2014 |
| KR | 101784408 | B1 | 10/2017 |
| KR | 1020210152549 | A | 12/2021 |
| WO | 2012105758 | A2 | 8/2012 |

* cited by examiner

ANTI-JAMMING TIME SYNCHRONIZATION METHOD AND APPARATUS FOR MAINTAINING TIME SYNCHRONIZATION BETWEEN GLOBAL POSITIONING SYSTEM AND SATELLITE-BASED AUGMENTATION SYSTEM

CROSS-REFERENCE TO RELATED APPLICATION

This application claims the benefit of Korean Patent Application No. 10-2023-0014421 filed on Feb. 2, 2023, in the Korean Intellectual Property Office, the entire disclosure of which is incorporated herein by reference for all purposes.

BACKGROUND

1. Field of the Invention

One or more embodiments relate to an anti-jamming time synchronization method and apparatus, and more specifically, to an anti-jamming time synchronization method and apparatus for maintaining time synchronization between a global positioning system (GPS) and a satellite-based augmentation system (SBAS).

2. Description of the Related Art

A global positioning system (GPS) is a satellite navigation system operated by the United States, which provides positioning, navigation, and timing (PNT) service. A user may easily and conveniently use navigation and timing service, by receiving at least four GPS satellite signals. Therefore, the GPS is used not only for smartphones and vehicle navigation that is close to real life but also for navigation and positioning in the fields of geodetic surveying and measurements. In addition, when precise time is required or when time synchronization between two or more devices is required, a GPS time synchronization apparatus is used.

Since the GPS uses code division multiple access (CDMA) method, the GPS has strong characteristics to a jamming signal by spreading code gain. However, since a GPS signal is weak, there is an issue that the GPS signal may not be used when attacked by jamming of a high-power signal. For example, if the strength of the GPS signal is at the level of starlight that may be seen on the mountains with clear air, the strength of the high-power jamming signal is at the level of a strong searchlight shooting from the side. Therefore, when a high-power jamming signal occurs in the same frequency band, the GPS signal becomes useless.

Since GPS time synchronization apparatuses are used for time synchronization of mobile communication networks, power grids, and financial networks that correspond to the national communication and power infrastructure, GPS time synchronization is managed as a very important factor in a country. However, when GPS jamming occurs, the GPS time synchronization apparatuses are bound to be useless. In Korea, there have been cases where the clocks of mobile phones operating with GPS signals were incorrect or the quality of mobile communication reduced, due to GPS jamming that occurred in 2010 and 2011.

Therefore, a time synchronization method has been requested, which may be stably used in a GPS jamming situation.

SUMMARY

One or more embodiments provide a method and apparatus for maintaining global positioning system (GPS) time synchronization even in a GPS jamming situation, by stably receiving a satellite-based augmentation system (SBAS) signal, which is a navigation signal that may allow time-synchronized ranging with a GPS, using a directional antenna even in the GPS jamming situation, and by calculating GPS time with the received SBAS signal.

According to an aspect, there is provided an anti-jamming time synchronization method including receiving a GPS signal from a GPS satellite using an omnidirectional antenna, receiving an SBAS signal from an SBAS satellite using a directional antenna, calculating measurement values of the GPS signal and the SBAS signal, decoding a GPS message of the GPS signal and an SBAS message of the SBAS signal, when the measurement values are values within a normal range, synchronizing time with GPS time based on a measurement value of the GPS signal and the GPS message, and when the measurement values are values beyond the normal range, synchronizing time with the GPS time based on a measurement value of the SBAS signal and the SBAS message.

The synchronizing of the time with the GPS time based on the GPS message may include identifying a location of the omnidirectional antenna using the measurement value of the GPS signal and the GPS message and generating current time synchronized with the GPS time, a frequency synchronized with the GPS time, and a 1 pulse per second (1PPS) signal synchronized with the GPS time based on the location of the omnidirectional antenna.

The generating of the 1PPS signal synchronized with the GPS time may include measuring a delay path between the omnidirectional antenna and a time synchronization generator configured to perform anti-jamming time synchronization and correcting the current time synchronized with the GPS time according to the delay path.

The synchronizing of the time with the GPS time based on the SBAS message may include reducing an strength of a signal transmitted in a direction in which the directional antenna is not directed, by selecting the directional antenna, determining current time synchronized with the GPS time using the measurement value of the SBAS signal, the SBAS message, and a delay information according to a delay path between the directional antenna and a time synchronization generator configured to perform anti-jamming time synchronization, and generating a frequency synchronized with the GPS time and a 1PPS signal synchronized with the GPS time according to the current time synchronized with the GPS time.

The determining of the current time synchronized with the GPS time may include determining transmission time information, satellite information, a satellite time error, ionospheric delay time, and tropospheric delay time based on the SBAS message, determining time at which the SBAS signal is transmitted from the SBAS satellite based on the transmission time information, determining a location of the SBAS satellite based on the time at which the SBAS signal is transmitted and the satellite information, determining radio wave travel time based on the location of the SBAS satellite and a location of the directional antenna, and determining the current time based on the radio wave travel time, the ionospheric delay time, and the tropospheric delay time.

The anti-jamming time synchronization method may further include determining the time at which the SBAS signal is transmitted with respect to GPS reference time by compensating for the time at which the SBAS signal is transmitted based on the satellite time error, wherein the determining of the location of the SBAS satellite may include determining the location of the SBAS satellite based on the time at which the SBAS signal is transmitted and the satellite information with respect to the GPS reference time.

The satellite information may include at least one of location information of the SBAS satellite, velocity information of the SBAS satellite, or acceleration information of the SBAS satellite.

The determining of the ionospheric delay time and the tropospheric delay time may include determining an ionospheric delay time error from the location of the directional antenna to a direction in which the SBAS satellite is located, using ionospheric delay correction information included in the SBAS message, and determining a tropospheric delay time error from the location of the directional antenna to the direction in which the SBAS satellite is located, using tropospheric delay correction information included in the SBAS message.

The determining of the time at which the SBAS signal is transmitted may include determining the time at which the SBAS signal is transmitted using the transmission time information included in the SBAS message to the number of bits, the number of pieces of codes, the number of chips, code, and a carrier phase value.

The measurement values may include at least one of a pseudo range of the GPS signal, Doppler of the GPS signal, a carrier phase value of the GPS signal, a signal-to-noise ratio of the GPS signal, a pseudo range of the SBAS signal, Doppler of the SBAS signal, a carrier phase value of the SBAS signal, or a signal-to-noise ratio of the SBAS signal.

According to another aspect, there is provided an anti-jamming time synchronization apparatus including an omnidirectional antenna configured to receive a GPS signal from a GPS satellite, a directional antenna configured to receive an SBAS signal from an SBAS satellite, and a time synchronization generator, wherein the time synchronization generator may be configured to calculate measurement values of the GPS signal and the SBAS signal, decode a GPS message of the GPS signal and an SBAS message of the SBAS signal, when the measurement values are values within a normal range, synchronize time with GPS time based on a measurement value of the GPS signal and the GPS message, and when the measurement values are values beyond the normal range, synchronize time with GPS time based on a measurement value of the SBAS signal and the SBAS message.

The anti-jamming time synchronization apparatus may further include a switch configured to control a reception path through which the GPS signal from the omnidirectional antenna and the SBAS signal the directional antenna are transmitted to the time synchronization generator, wherein the time synchronization generator may be further configured to, when the measurement values of the GPS signal are values beyond the normal range, request the switch to control the reception path to receive only the SBAS signal transmitted from the directional antenna.

The time synchronization generator may be further configured to, when the measurement values of the GPS signal are values beyond the normal range, determine current time synchronized with the GPS time using the measurement value of the SBAS signal, the SBAS message, and a delay information according to a delay path between the directional antenna and the time synchronization generator configured to perform anti-jamming time synchronization, and generate a frequency synchronized with the GPS time and a 1PPS signal synchronized with the GPS time based on the current time synchronized with the GPS time.

The time synchronization generator may further be configured to determine transmission time information, satellite information, a satellite time error, ionospheric delay time, and tropospheric delay time based on the SBAS message, determine time at which the SBAS signal is transmitted from the SBAS satellite based on the transmission time information, determine a location of the SBAS satellite based on the time at which the SBAS signal is transmitted and the satellite information, determine radio wave travel time based on the location of the SBAS satellite and a location of the directional antenna, and determine the current time based on the radio wave travel time, the ionospheric delay time, and the tropospheric delay time.

The time synchronization generator may further be configured to determine GPS reference time by compensating for the time at which the SBAS signal is transmitted based on the satellite time error and determine the location of the SBAS satellite based on the GPS reference time and the satellite information.

The time synchronization generator may further be configured to determine an ionospheric delay time error from the location of the directional antenna to a direction in which the SBAS satellite is located, using ionospheric delay correction information included in the SBAS message, and determine a tropospheric delay time error from the location of the directional antenna to the direction in which the SBAS satellite is located, using tropospheric delay correction information included in the SBAS message.

The time synchronization generator may further be configured to determine the time at which the SBAS signal is transmitted using the transmission time information included in the SBAS message to the number of bits, the number of pieces of codes, the number of chips, code, and a carrier phase value.

The time synchronization generator may further be configured to, when the measurement values are values within the normal range, identify a location of the omnidirectional antenna using the measurement value of the GPS signal and the GPS message and generate current time synchronized with the GPS time, a frequency synchronized with the GPS time, and a 1PPS signal synchronized with the GPS time based on the location of the omnidirectional antenna.

The measurement values may include at least one of a pseudo range of the GPS signal, Doppler of the GPS signal, a carrier phase value of the GPS signal, a signal-to-noise ratio of the GPS signal, a pseudo range of the SBAS signal, Doppler of the SBAS signal, a carrier phase value of the SBAS signal, or a signal-to-noise ratio of the SBAS signal.

Additional aspects of embodiments will be set forth in part in the description which follows and, in part, will be apparent from the description, or may be learned by practice of the disclosure.

According to an embodiment, GPS time synchronization may be maintained even in a GPS jamming situation, by stably receiving an SBAS signal, which is a navigation signal that may allow time-synchronized ranging with a GPS, using a directional antenna even in the GPS jamming situation, and by calculating GPS time with the received SBAS signal.

BRIEF DESCRIPTION OF THE DRAWINGS

These and/or other aspects, features, and advantages of the invention will become apparent and more readily appreciated from the following description of embodiments, taken in conjunction with the accompanying drawings of which.

DETAILED DESCRIPTION

Hereinafter, embodiments of the present disclosure are described in detail with reference to the attached drawings. An anti-jamming time synchronization method according to an embodiment may be performed by an anti-jamming time synchronization apparatus, which is a receiver of an anti-jamming time synchronization system.

Figure 1:
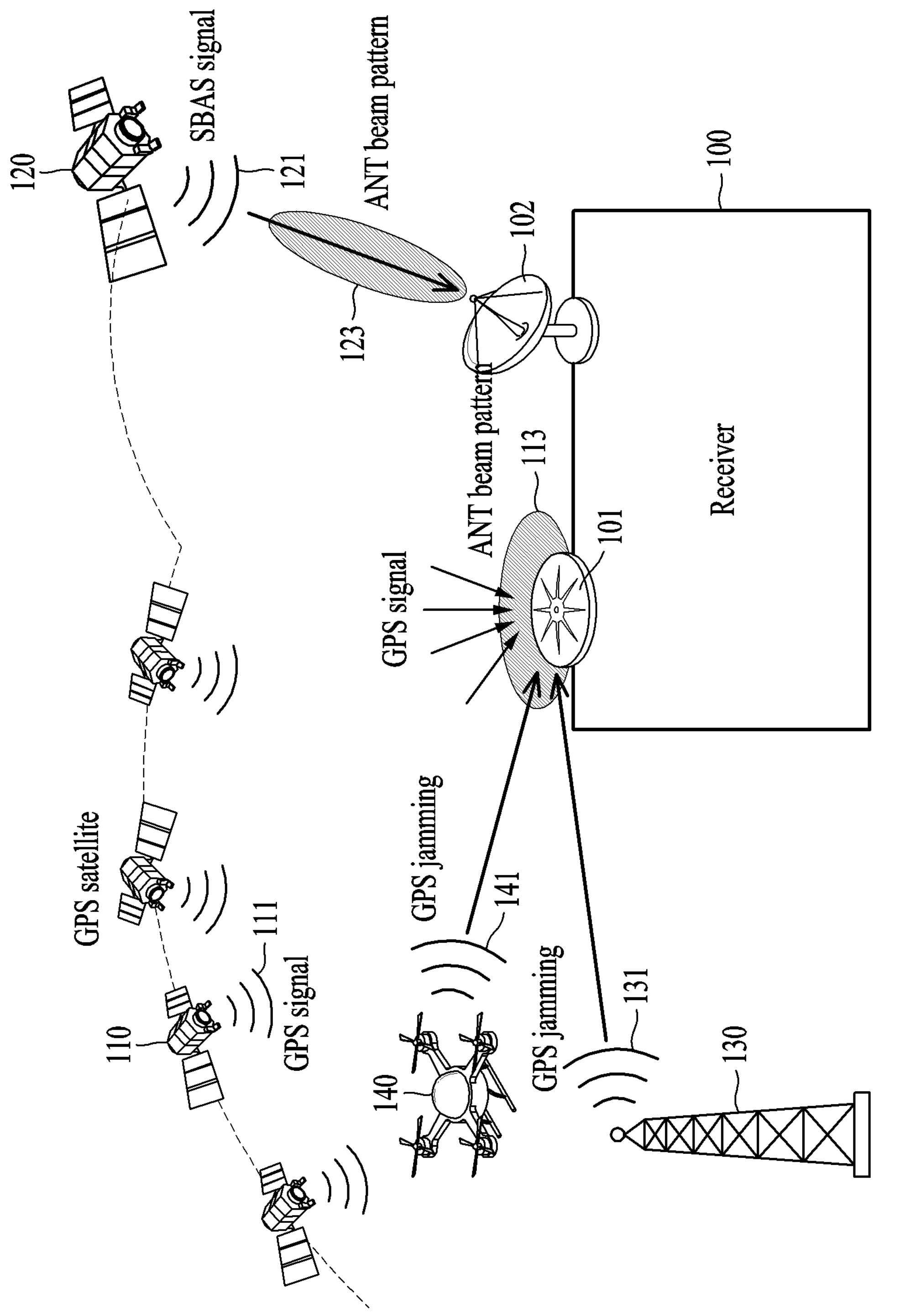
FIG. 1 is a diagram illustrating an anti-jamming time synchronization system according to an embodiment.

FIG. 1 is a diagram illustrating an anti-jamming time synchronization system according to an embodiment.

The anti-jamming time synchronization system according to the present disclosure may generate global positioning system (GPS) reference time using a GPS signal and a satellite-based augmentation system (SBAS) signal and may normally maintain time synchronization between two or more apparatuses based on the GPS reference time. The anti-jamming time synchronization system may include GPS satellites 110, an SBAS satellite 120, and a receiver 100. The receiver 100 may include an omnidirectional antenna 101 and a directional antenna 102. In addition, the receiver 100 may be an anti-jamming time synchronization apparatus.

Each of the GPS satellites 110 may transmit a GPS signal 111 synchronized with GPS time. Since the GPS satellites 110 orbit in a 12-hour period, the location of each of the GPS satellites 110 may change continuously with respect to the receiver 100 located on the ground. Thus, the receiver 100 may use the omnidirectional antenna 101 having an omnidirectional beam 113 to receive at least four GPS signals 111 transmitted from each of the GPS satellites 110.

However, the omnidirectional antenna 101 may receive, as an antenna gain of the same level as the GPS signal 111, even jamming signals generated in any direction, such as a jamming signal 131 transmitted from a fixed GPS jammer 130 or a jamming signal 141 transmitted from a mobile jammer 140 mounted on a drone and moving. Accordingly, when a jamming signal is generated, the receiver 100 may not operate normally due to the jamming signal entering the omnidirectional antenna 101 with an strength greater than the GPS signal 111.

In addition, the SBAS satellite 120 may also transmit an SBAS signal 121 synchronized with the GPS time. An SBAS system and operating station may monitor and control the SBAS signal 121 to be synchronized with the GPS time on the SBAS satellite 120.

Therefore, since the SBAS signal 121 is a ranging signal synchronized time with a GPS including GPS correction information, the SBAS signal 121 may be a navigation signal that may be measured to be at the same distance as the GPS signal 111.

In addition, since the SBAS satellite 120 is a geostationary orbit (GEO) satellite, the location of the SBAS satellite 120 may be in a fixed state with respect to the receiver 100 located on the ground. Therefore, the receiver 100 may receive the SBAS signal 121 using the directional antenna 102 having a directional beam 123 with a high gain only in the direction of the SBAS satellite 120.

The receiver 100 may receive the SBAS signal 121 through the directional antenna 102 facing in the direction of the SBAS satellite 120, which is the direction in which the SBAS satellite 120 is located, as shown in FIG. 1. Here, the jamming signal received by the directional antenna 102 from a direction different from the direction of the SBAS satellite 120 has an antenna gain lower than the SBAS signal 121, and thus, an anti-jamming effect of suppressing the jamming signal may occur.

The receiver 100 may calculate measurement values of the GPS signal 111 and the SBAS signal 121. The receiver 100 may decode a GPS message of the GPS signal 111 and an SBAS message of the SBAS signal 121. When the measurement values of the GPS signal 111 and the SBAS signal 121 are values within a normal range, the receiver 100 may synchronize time with the GPS time based on the measurement value of the GPS signal 111 and the GPS message. In addition, when the measurement values of the GPS signal 111 or the SBAS signal 121 are values beyond the normal range, the receiver 100 may synchronize time with the GPS time based on the measurement value of the SBAS signal 121 and the SBAS message.

The receiver 100 may measure the location of the directional antenna 102, which is the reception location of the SBAS signal 121, using the GPS signal 111 in a situation where the GPS signal 111 is normally received. In addition, the SBAS message may include all ionospheric delay error information over the service area. Accordingly, the receiver 100 may calculate ionospheric error information in the direction of the SBAS satellite 120 at the location of the directional antenna 102 to eliminate the ionospheric delay error, which is a large error in navigation.

In addition, the SBAS message may include the time at which the SBAS signal 121 is transmitted from the SBAS satellite 120 and location information of the SBAS satellite 120. Accordingly, the receiver 100 may determine the radio wave travel time corresponding to the distance from the receiver 100 to the SBAS satellite 120, based on the time transmitted from the SBAS satellite 120, the location information of the SBAS satellite 120, and the location of the directional antenna 102.

In addition, the receiver 100 may determine current time synchronized with the GPS time using the radio wave travel time so that the GPS time synchronization may be maintained using only the SBAS signal 121 in the jamming situation.

The present disclosure may maintain GPS time synchronization even in a GPS jamming situation, by stably receiving an SBAS signal, which is a navigation signal that may allow time-synchronized ranging with a GPS, using a directional antenna even in the GPS jamming situation, and by calculating GPS time with the received SBAS signal.

Figure 2:
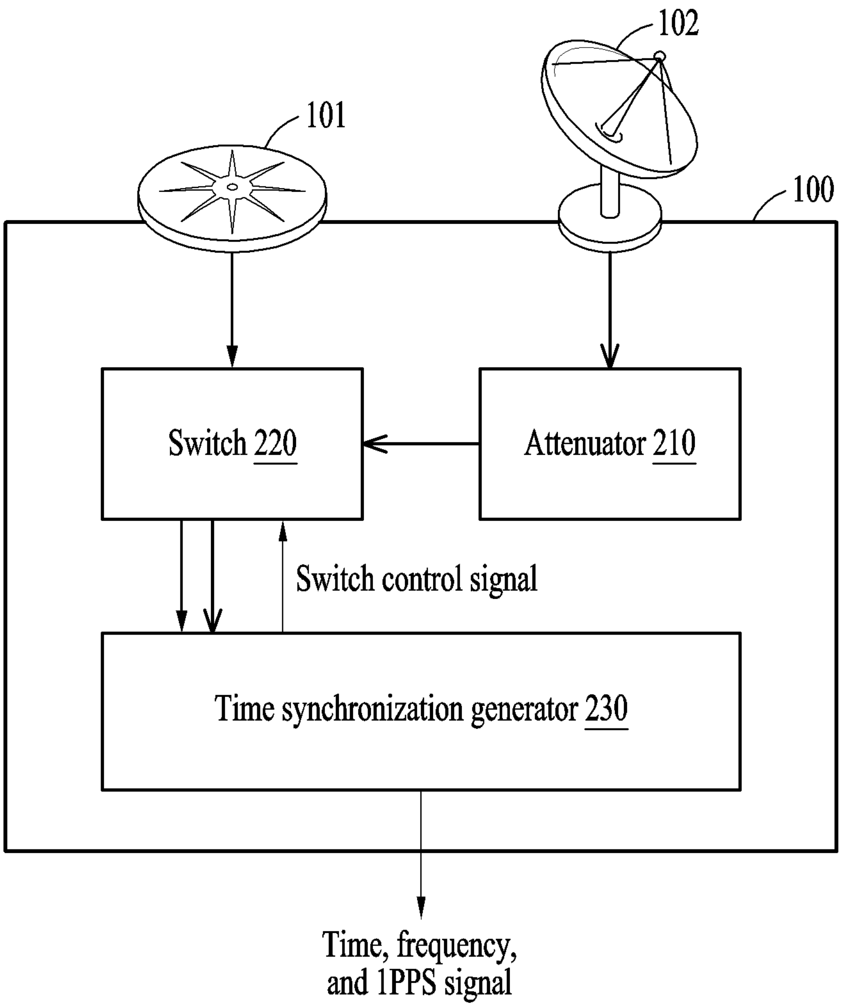
FIG. 2 is a diagram illustrating a receiver of an anti-jamming time synchronization system according to an embodiment.

FIG. 2 is a diagram illustrating a receiver (an anti-jamming time synchronization apparatus) of an anti-jamming time synchronization system according to an embodiment.

The receiver 100 may include the omnidirectional antenna 101, the directional antenna 102, an attenuator 210, a switch 220, and a time synchronization generator 230, as shown in FIG. 2.

An SBAS signal received through the directional antenna 102 may be increased in strength over a GPS signal by the gain of the directional antenna 102. The attenuator 210 may reduce the strength of the SBAS signal so that the strength of the SBAS signal corresponds to the strength of the GPS signal received through the omnidirectional antenna 101. For example, the attenuator 210 may reduce the strength of the SBAS signal so that the difference between the strength of the SBAS signal and the strength of the GPS signal received through the omnidirectional antenna 101 is less than a threshold value.

The switch 220 may control a reception path through which the GPS signal is transmitted from the omnidirectional antenna 101 to the time synchronization generator 230 and a reception path through which the SBAS signal is transmitted from the directional antenna 102 to the time synchronization generator 230 through the attenuator 210.

The time synchronization generator 230 may determine whether jamming occurs using the GPS signal and the SBAS signal. When jamming is determined not to have occurred, the time synchronization generator 230 may transmit a switch control signal for selecting the omnidirectional antenna 101 to the switch 220. In addition, the switch 220 may select the reception path through which the GPS signal is transmitted from the omnidirectional antenna 101 to the time synchronization generator 230 according to the received switch control signal, and may block the reception path through which the SBAS signal is transmitted to the time synchronization generator 230 through the attenuator 210, and thus, the reception path may be controlled so that the GPS signal received from the omnidirectional antenna 101 is transmitted to the time synchronization generator 230. Here, the time synchronization generator 230 may synchronize time with the GPS time based on a measurement value of the GPS signal and a GPS message.

In addition, when jamming is determined to have occurred, the time synchronization generator 230 may transmit a switch control signal for selecting the directional antenna 102 to the switch 220. In addition, the switch 220 may select the reception path through which the SBAS signal is transmitted from the directional antenna 102 to the time synchronization generator 230 through the attenuator 210 according to the received switch control signal, and may block the reception path through which the GPS signal is transmitted to the time synchronization generator 230, and thus, the reception path may be controlled so that only the SBAS signal received from the directional antenna 102 is transmitted to the time synchronization generator 230. Here, the time synchronization generator 230 may synchronize time with the GPS time based on a measurement value of the SBAS signal and an SBAS message.

Figure 3:
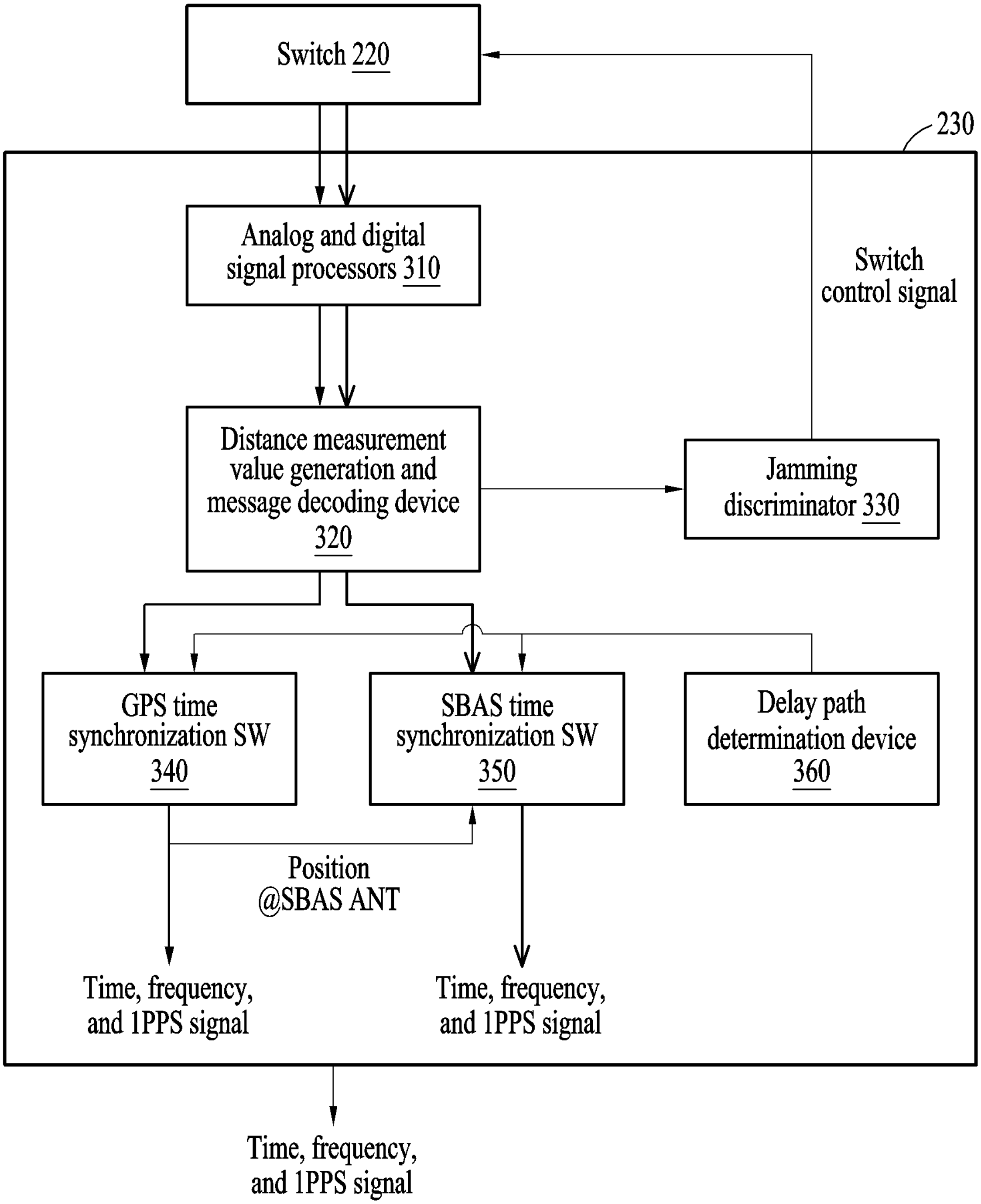
FIG. 3 is a diagram illustrating a time synchronization generator of a receiver of an anti-jamming time synchronization system according to an embodiment.

FIG. 3 is a diagram illustrating a time synchronization generator of a receiver of an anti-jamming time synchronization system according to an embodiment.

The time synchronization generator 230 may include analog and digital signal processors 310, a distance measurement value generation and message decoding device 320, a jamming discriminator 330, GPS time synchronization software (SW) 340, SBAS time synchronization SW 350, and a delay path determination device 360. Here, the analog and digital signal processors 310, the distance measurement value generation and message decoding device 320, the jamming discriminator 330, and the delay path determination device 360 may be different processors or may each be a module included in one processor. In addition, the GPS time synchronization SW 340 and the SBAS time synchronization SW 350 may each be a processor in which each SW is executed, or a storage medium in which each SW is installed.

The analog and digital signal processors 310 may receive at least one of a GPS signal or an SBAS signal from the switch 220. In addition, an analog signal processor of the analog and digital signal processors 310 may quantize the received signal through a process such as an analog filter, frequency conversion, analog-to-digital conversion, and the like. Subsequently, a digital signal processor of the analog and digital signal processors 310 may perform digital signal processing on data quantized in the analog signal processor to synchronize and track code and a carrier signal. In addition, the digital signal processor may perform message demodulation to extract a data row (symbols) of 0 and 1 from the GPS signal and the SBAS signal. Furthermore, the digital signal processor may perform Viterbi decoding on the data row (symbols) of 0 and 1 extracted through the message demodulation. For example, the digital signal processor may perform Viterbi decoding on 500 symbol data and may convert the 500 symbol data into 250-bit data, which is an SBAS message frame unit.

The distance measurement value generation and message decoding device 320 may calculate measurement values of the GPS signal and the SBAS signal using a signal processing result value output from the analog and digital signal processors 310. The measurement values calculated by the distance measurement value generation and message decoding device 320 may include at least one of a pseudo range of the GPS signal, Doppler of the GPS signal, a carrier phase value of the GPS signal, a signal-to-noise ratio of the GPS signal, a pseudo range of the SBAS signal, Doppler of the SBAS signal, a carrier phase value of the SBAS signal, or a signal-to-noise ratio of the SBAS signal. In addition, the distance measurement value generation and message decoding device 320 may decode a GPS message and an SBAS message to calculate necessary information for obtaining a navigation solution, such as a satellite orbit and time error, ionospheric and tropospheric delay correction information, etc. Here, the decoding of the GPS message and the SBAS message may be an operation in which the distance measurement value generation and message decoding device 320 decodes meaningful data (the necessary information) by dividing the data row of 0 and 1 of the SBAS message frame unit (250 bits) for each field. For example, the distance measurement value generation and message decoding device 320 may perform a process such as SBAS signal processing, message demodulation and decoding, etc., in accordance with ICAO Annex 10 Volume 1 Appendix B and RTCA/DO-229D, Appendix A, which are SBAS standard documents.

The jamming discriminator 330 may determine whether jamming occurs based on the measurement values of the GPS signal and the SBAS signal.

When the measurement values of the GPS signal and the SBAS signal are values within a normal range, the jamming discriminator 330 may determine that jamming has not occurred. Here, the jamming discriminator 330 may transmit a switch control signal for selecting the omnidirectional antenna 101 to the switch 220. In addition, the jamming discriminator 330 may drive the GPS time synchronization SW 340.

When the measurement values of the GPS signal or the SBAS signal are values beyond the normal range, the jamming discriminator 330 may determine that jamming has occurred. Here, the jamming discriminator 330 may transmit a switch control signal for selecting the directional antenna 102 to the switch 220. In addition, the jamming discriminator 330 may drive the SBAS time synchronization SW 350.

The GPS time synchronization SW 340 may identify the location of the omnidirectional antenna 101 using the measurement value of the GPS signal and the GPS message. In addition, the GPS time synchronization SW 340 may accumulate the identified location and may calculate the precise location of the omnidirectional antenna 101. Furthermore, the GPS time synchronization SW 340 may generate current time synchronized with the GPS time, a frequency synchronized with the GPS time, and a 1 pulse per second (1PPS) signal synchronized with the GPS time based on the precise location of the omnidirectional antenna 101.

The GPS time synchronization SW 340 may measure the location of the directional antenna 102 in advance, before jamming occurs. In order to measure the location of the directional antenna 102, the omnidirectional antenna 101 in the receiver 100 may be placed as close as possible to the directional antenna 102. In addition, the GPS time synchronization SW 340 may measure the location of the directional antenna 102 in advance using the received GPS signal.

An error may occur in the time generated by the time synchronization generator 230 depending on a time delay according to a delay path between the time synchronization generator 230 and the omnidirectional antenna 101. Accordingly, the delay path determination device 360 may measure the delay path between the time synchronization generator 230 and the omnidirectional antenna 101 and the time delay according to the delay path and may transmit the measured delay path and the measured time delay to the GPS time synchronization SW 340. In addition, the GPS time synchronization SW 340 may correct the current time synchronized with the GPS time according to the transmitted delay path and the transmitted time delay.

In addition, the delay path determination device 360 may measure a time delay according to a delay path between the time synchronization generator 230 and the directional antenna 102 and may transmit the measured delay path and the measured time delay to the SBAS time synchronization SW 350. The delay path determination device 360 may measure delay paths and time delays in advance, before jamming occurs. For example, the delay path determination device 360 may measure the time delay according to the delay path between the time synchronization generator 230 and the omnidirectional antenna 101 and the time delay according to the delay path between the time synchronization generator 230 and the directional antenna 102, at the time the receiver 100 is installed.

The SBAS time synchronization SW 350 may determine the current time synchronized with the GPS time using the measurement value of the SBAS signal, the SBAS message, and a delay information according to the delay path between the directional antenna 102 and the time synchronization generator 230. In addition, the SBAS time synchronization SW 350 may generate a frequency synchronized with the GPS time and a 1PPS signal synchronized with the GPS time according to the current time synchronized with the GPS time.

Figure 4:
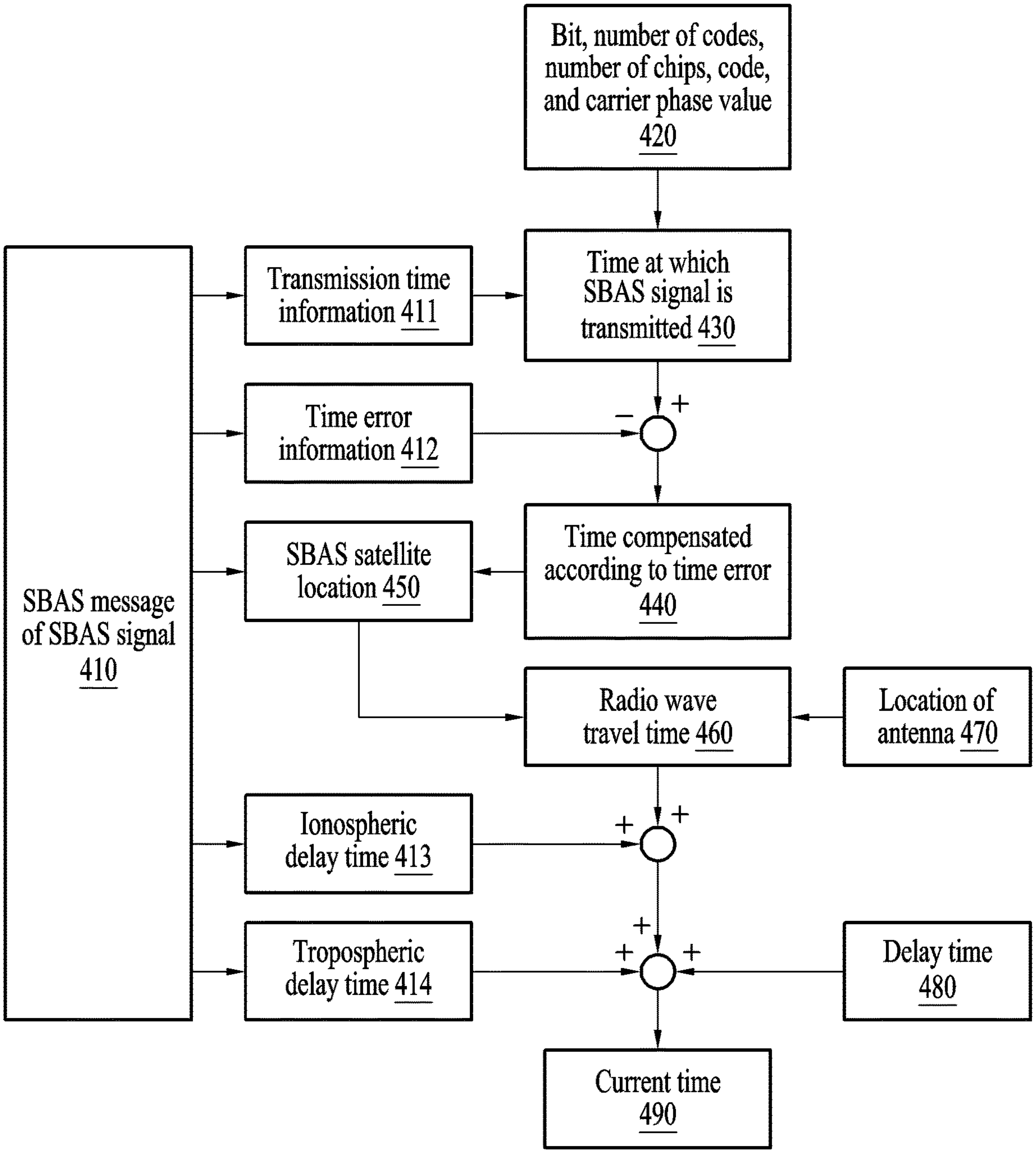
FIG. 4 is an example of a process of determining current time synchronized with GPS time in an anti-jamming time synchronization method according to an embodiment.

FIG. 4 is an example of a process of determining current time synchronized with GPS time in an anti-jamming time synchronization method according to an embodiment.

The SBAS time synchronization SW 350 may determine transmission time information 411, a SBAS satellite time error 412, satellite information, ionospheric delay time error 413, and tropospheric delay time error 414 based on an SBAS message 410 of an SBAS signal. Here, the transmission time information 411 indicating the time at which the SBAS signal is transmitted from the SBAS satellite 120 may be information about when a first bit starting point of a corresponding message frame is transmitted from the SBAS satellite 120 with respect to the GPS reference time.

In addition, the time according to the transmission time information 411 may be slower or faster than the actual time at which the SBAS signal is transmitted from the SBAS satellite 120. Accordingly, the SBAS time synchronization SW 350 may periodically measure the SBAS signal to identify the difference between the transmission time information 411 and the actual time at which the SBAS signal is transmitted from the SBAS satellite 120. In addition, the SBAS time synchronization SW 350 may determine the identified difference as the SBAS satellite time error 412.

In addition, the SBAS time synchronization SW 350 may measure the number of bits, the number of pieces of codes, the number of chips, code, and a carrier phase value 420 at any point in time. The point at which the receiver 100 receives the SBAS signal may more likely be the midpoint of the message frame rather than the first bit starting point of the message frame. Accordingly, in order to measure the GPS time at a random reception point, the SBAS time synchronization SW 350 may measure the number of bit, the number of pieces of codes, the number of chips, the code, and the carrier phase value 420 passed between the first bit starting point of the message frame and the time at which the SBAS signal is received. When the time at which the receiver 100 receives the SBAS signal is the first bit starting point of the message frame, the SBAS time synchronization SW 350 may skip the measurement of the number of bit, the number of pieces of codes, the number of chips, the code, and the carrier phase value 420.

The SBAS time synchronization SW 350 may use the number of bit, the number of pieces of codes, the number of chips, the code, and the carrier phase value 420 and the transmission time information 411 included in the SBAS message and may calculate time 430 at which the SBAS signal measured at the current time is transmitted from the SBAS satellite 120. Specifically, the SBAS time synchronization SW 350 may identify the time at which the first bit starting point of the message frame is transmitted from the SBAS satellite 120 with respect to the GPS reference time using the transmission time information 411. In addition, when the time at which the SBAS signal is received is different from the first bit starting point of the message frame, the SBAS time synchronization SW 350 may apply the number of bit, the number of pieces of codes, the number of chips, the code, and the carrier phase value 420 to the identified time to determine the point in time at which the SBAS signal is received with respect to the GPS reference time and may define the determined point in time as the time 430 at which the SBAS signal is transmitted from the SBAS satellite 120.

As described above, since the transmission time information 411 is different from the actual time at which the SBAS signal is transmitted from the SBAS satellite 120, the time 430 determined based on the transmission time information 411 may also be different from the actual time at which the SBAS signal is transmitted with respect to the GPS reference time. Accordingly, the SBAS time synchronization SW 350 may compensate for the time 430 at which the SBAS signal is transmitted from the SBAS satellite 120 based on the SBAS satellite time error 412 to determine time 440 at which the SBAS signal is transmitted with respect to the GPS reference time. For example, the SBAS time synchronization SW 350 may determine the time 440 at which the SBAS signal is transmitted with respect to the GPS reference time in accordance with ICAO Annex 10 Volume 1 Appendix B and RTCA/DO-229D, Appendix A, which are SBAS standard documents. Here, the time 440 at which the SBAS signal is transmitted with respect to the GPS reference time may be the time 430 at which the SBAS signal is transmitted from the SBAS satellite 120 minus the SBAS satellite time error 412.

Subsequently, the SBAS time synchronization SW 350 may determine an SBAS satellite location 450 using the time 440 at which the SBAS signal is transmitted with respect to the GPS reference time, the time 430 at which the SBAS signal is transmitted from the SBAS satellite 120 compensated for a GPS time error, and the satellite information included in the SBAS message. Here, the satellite information may include at least one of location information, velocity information, or acceleration information of the SBAS satellite 120. In addition, the SBAS satellite location 450 may be the location of the SBAS satellite 120.

Subsequently, the SBAS time synchronization SW 350 may use a location 470 of the directional antenna 102 and the SBAS satellite location 450 measured in advance to determine radio wave travel time 460 corresponding to the actual distance between the directional antenna 102 and the SBAS satellite 120.

Here, since a radio wave travel path from the SBAS satellite 120 to the receiver 100 includes ionospheric and tropospheric delay time errors, adding a corresponding delay time error is required. Accordingly, the SBAS time synchronization SW 350 may determine the ionospheric delay time error 413 in the direction from the location 470 of the directional antenna 102 to the SBAS satellite location 450 using ionospheric delay correction information included in the SBAS message. In addition, the SBAS time synchronization SW 350 may determine the tropospheric delay error 414 in the direction from the location 470 of the directional antenna 102 to the SBAS satellite location 450 using tropospheric delay correction information. For example, the SBAS time synchronization SW 350 may determine the SBAS satellite location 450, the ionospheric delay time error 413, and the convolution layer delay time error 414 according to the ICAO Annex 10 Volume 1 Appendix B and RTCA/DO-229D, Appendix A, which are SBAS standard documents.

In addition, the SBAS time synchronization SW 350 may determine current time 490 synchronized with the GPS time based on the radio wave travel time 460, the ionospheric delay time error 413, and the tropospheric delay time error 414.

Specifically, the current time 490 synchronized with the GPS time may be an addition of the time 440 at which the SBAS signal is transmitted with respect to the GPS reference time, the radio wave travel time 460, the ionospheric delay time error 413, the tropospheric delay time error 414, and delay time 480.

Here, the delay time 480 may be a time delay according to the delay path between the time synchronization generator 230 and the omnidirectional antenna 101 determined by the delay path determination device 360.

In addition, after determining the current time 490 synchronized with the GPS time, the SBAS time synchronization SW 350 may generate a 1PPS signal synchronized with the GPS time based on the current time 490 or may also generate coordinated universal time (UTC). Furthermore, the SBAS time synchronization SW 350 may generate an accurate clock by correcting the accuracy of a local clock embedded in a receiver using the 1PPS signal synchronized with the GPS time.

Figure 5:
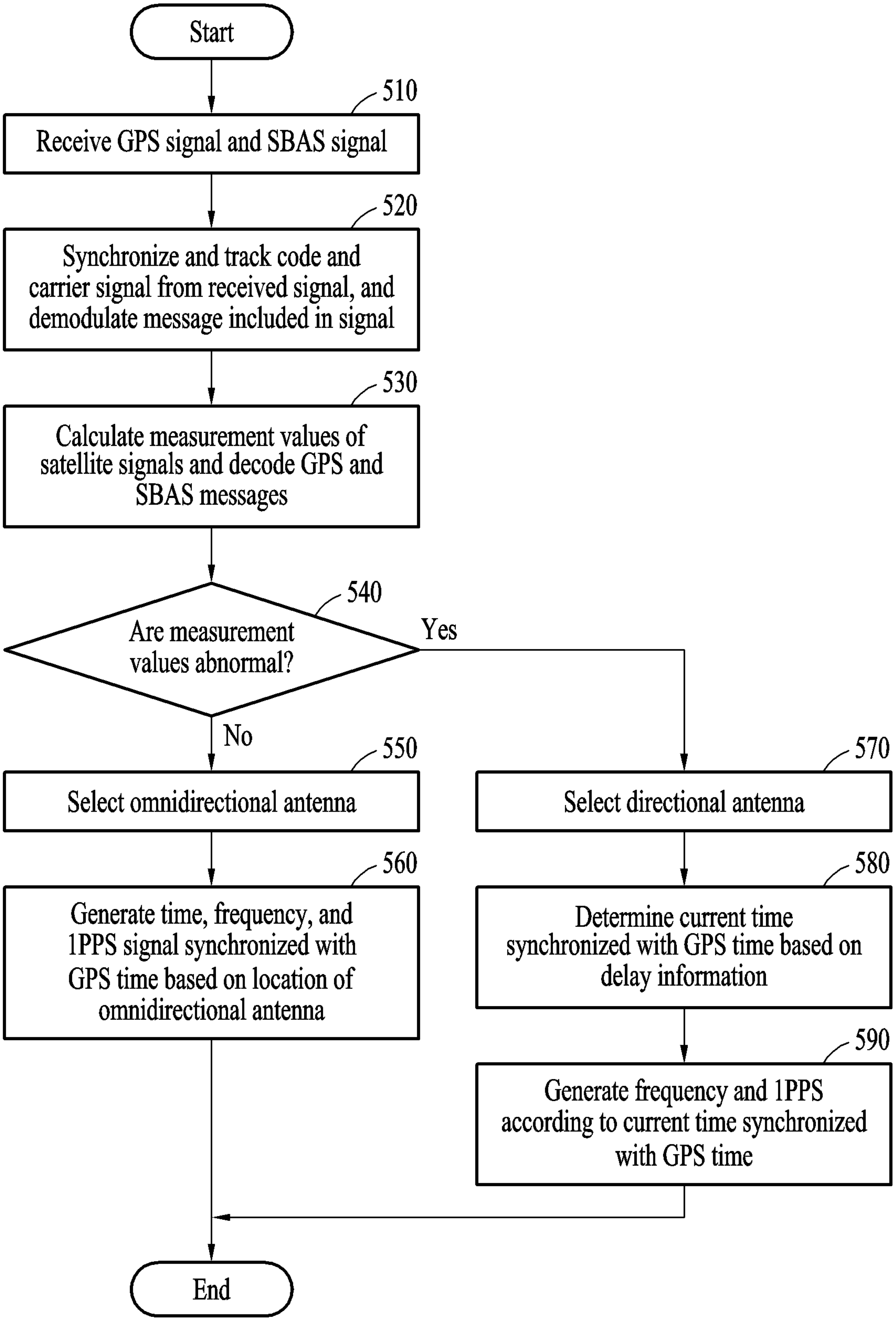
FIG. 5 is a flowchart illustrating an anti-jamming time synchronization method according to an embodiment.

FIG. 5 is a flowchart illustrating an anti-jamming time synchronization method according to an embodiment.

In operation 510, the omnidirectional antenna 101 may receive a GPS signal from the GPS satellite 110. In addition, the directional antenna 102 may receive an SBAS signal from the SBAS satellite 120.

In operation 520, the time synchronization generator 230 may receive at least one of the GPS signal or the SBAS signal from the switch 220. In addition, the signal synchronization generator 230 may quantize the received signal through an analog filter, frequency conversion, analog-to-digital conversion, and the like. Subsequently, the signal synchronization generator 230 may perform digital signal processing on the quantized data to synchronize and track code and a carrier signal, may demodulate a message, and may perform Viterbi decoding.

In operation 530, the signal synchronization generator 230 may calculate measurement values of the GPS signal and the SBAS signal using a signal processing result value output in operation 520. In addition, the signal synchronization generator 230 may decode a GPS message and an SBAS message to calculate necessary information for obtaining a navigation solution, such as a satellite orbit and time error, ionospheric and tropospheric delay correction information, etc.

In operation 540, the signal synchronization generator 230 may determine whether the measurement values of the GPS signal and the SBAS signal calculated in operation 530 are abnormal. When the measurement values of the GPS signal and the SBAS signal are values within a normal range, the signal synchronization generator 230 may determine that the measurement values are normal and that jamming has not occurred. Here, the signal synchronization generator 230 may perform operation 550.

When the measurement values of the GPS signal or the SBAS signal are values beyond the normal range, the signal synchronization generator 230 may determine that the measurement values are abnormal and that jamming has occurred. Here, the signal synchronization generator 230 may perform operation 570.

In operation 550, the signal synchronization generator 230 may transmit a switch control signal for selecting the omnidirectional antenna 101 to the switch 220.

In operation 560, the signal synchronization generator 230 may identify the location of the omnidirectional antenna 101 using the measurement value of the GPS signal and the GPS message. In addition, the signal synchronization generator 230 may accumulate the identified location and may calculate the precise location of the omnidirectional antenna 101. Furthermore, the signal synchronization generator 230 may generate current time synchronized with GPS time, a frequency synchronized with the GPS time, and a 1PPS signal synchronized with GPS time based on the precise location of the omnidirectional antenna 101.

In operation 570, the signal synchronization generator 230 may transmit a switch control signal for selecting the directional antenna 102 to the switch 220.

In operation 580, the signal synchronization generator 230 may determine the current time synchronized with the GPS time using the measurement value of the SBAS signal, the SBAS message, and a delay information according to the delay path between the directional antenna 102 and the time synchronization generator 230.

In operation 590, the signal synchronization generator 230 may generate a frequency synchronized with the GPS time and the 1PPS signal synchronized with the GPS time according to the current time synchronized with the GPS time.

Figure 6:
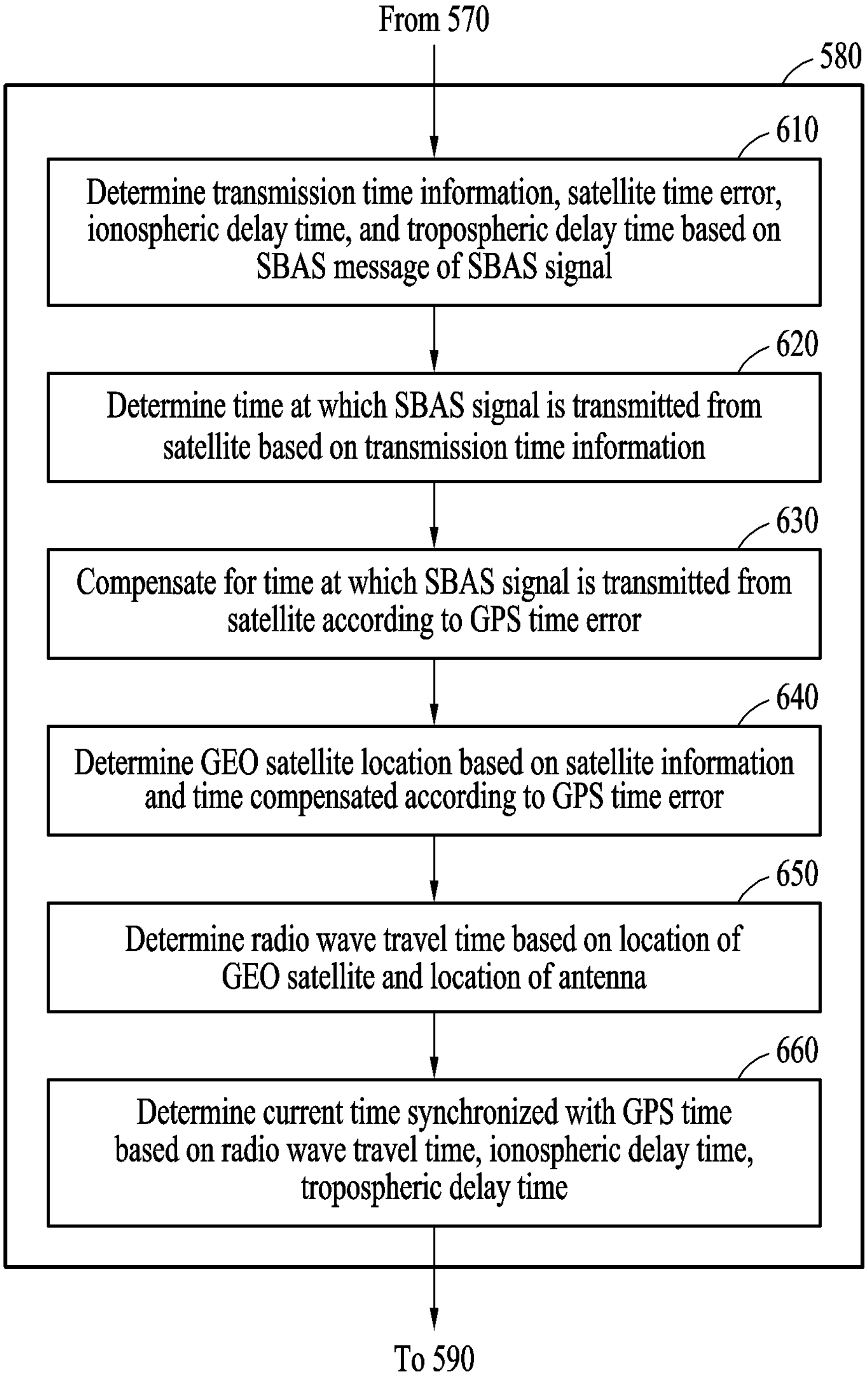
FIG. 6 is a flowchart illustrating a process of determining current time synchronized with GPS time in an anti-jamming time synchronization method according to an embodiment.

FIG. 6 is a flowchart illustrating a process of determining current time synchronized with GPS time in an anti-jamming time synchronization method according to an embodiment. Operations 610 to 660 of FIG. 6 may be included in operation 580 of FIG. 5.

In operation 610, the signal synchronization generator 230 may determine transmission time information, satellite time error, satellite information, ionospheric delay time, and tropospheric delay time based on the SBAS message 410 of an SBAS signal. In addition, the signal synchronization generator 230 may measure the number of bits, the number of pieces of codes, the number of chips, code, and a carrier phase value at any point in time.

In operation 620, the signal synchronization generator 230 may use the number of bit, the number of pieces of codes, the number of chips, the code, and the carrier phase value 420 and the transmission time information included in the SBAS message 410 and may calculate time at which the SBAS signal measured at the current time is transmitted from the SBAS satellite 120.

In operation 630, the signal synchronization generator 230 may compensate for the time at which the SBAS signal is transmitted from the SBAS satellite 120 based on the satellite time error to determine the time at which the SBAS signal is transmitted with respect to the GPS reference time.

In operation 640, the signal synchronization generator 230 may determine an SBAS satellite location using the time at which the SBAS signal is transmitted with respect to the GPS reference time, the time at which the SBAS signal is transmitted from the SBAS satellite 120 compensated for a GPS time error, and the satellite information included in the SBAS message.

In operation 650, the signal synchronization generator 230 may use a location of the directional antenna 102 and an SBAS satellite location measured in advance to determine the radio wave travel time corresponding to the actual distance between the directional antenna 102 and the SBAS satellite 120. Here, the signal synchronization generator 230 may determine the ionospheric delay time error 413 in the direction from the location of the directional antenna 102 to the SBAS satellite location 450 using ionospheric delay correction information included in the SBAS message. In addition, the signal synchronization generator 230 may determine the tropospheric delay error 414 in the direction from the location of the directional antenna 102 to the SBAS satellite location 450 using tropospheric delay correction information.

In operation 660, the signal synchronization generator 230 may determine the current time synchronized with the GPS time by adding the radio wave travel time, the ionospheric delay time error, a tropospheric delay time error, and delay time to the time at which the SBAS signal is transmitted with respect to the GPS reference time.

The components described in the embodiments may be implemented by hardware components including, for example, at least one digital signal processor (DSP), a processor, a controller, an application-specific integrated circuit (ASIC), a programmable logic element, such as a field programmable gate array (FPGA), other electronic devices, or combinations thereof. At least some of the functions or the processes described in the embodiments may be implemented by software, and the software may be recorded on a recording medium. The components, the functions, and the processes described in the embodiments may be implemented by a combination of hardware and software.

The method according to embodiments may be written in a computer-executable program and may be implemented as various recording media such as magnetic storage media, optical reading media, or digital storage media.

Various techniques described herein may be implemented in digital electronic circuitry, computer hardware, firmware, software, or combinations thereof. The techniques may be implemented as a computer program product, i.e., a computer program tangibly embodied in an information carrier, e.g., in a machine-readable storage device (for example, a computer-readable medium) or in a propagated signal, for processing by, or to control an operation of, a data processing apparatus, e.g., a programmable processor, a computer, or multiple computers. A computer program, such as the computer program(s) described above, may be written in any form of a programming language, including compiled or interpreted languages, and may be deployed in any form, including as a stand-alone program or as a module, a component, a subroutine, or other units suitable for use in a computing environment. A computer program may be deployed to be processed on one computer or multiple computers at one site or distributed across multiple sites and interconnected by a communication network.

Processors suitable for processing of a computer program include, by way of example, both general and special purpose microprocessors, and any one or more processors of any kind of digital computer. Generally, a processor will receive instructions and data from a read-only memory or a random-access memory, or both. Elements of a computer may include at least one processor for executing instructions and one or more memory devices for storing instructions and data. Generally, a computer also may include, or be operatively coupled to receive data from or transfer data to, or both, one or more mass storage devices for storing data, e.g., magnetic, magneto-optical disks, or optical disks. Examples of information carriers suitable for embodying computer program instructions and data include semiconductor memory devices, e.g., magnetic media such as hard disks, floppy disks, and magnetic tape, optical media such as compact disk read only memory (CD-ROM) or digital video disks (DVDs), magneto-optical media such as floptical disks, read-only memory (ROM), random-access memory (RAM), flash memory, erasable programmable ROM (EPROM), or electrically erasable programmable ROM (EEPROM). The processor and the memory may be supplemented by, or incorporated in special purpose logic circuitry.

In addition, non-transitory computer-readable media may be any available media that may be accessed by a computer and may include both computer storage media and transmission media.

Although the present specification includes details of a plurality of specific embodiments, the details should not be construed as limiting any invention or a scope that can be claimed, but rather should be construed as being descriptions of features that may be peculiar to specific embodiments of specific inventions. Specific features described in the present specification in the context of individual embodiments may be combined and implemented in a single embodiment. On the contrary, various features described in the context of a single embodiment may be implemented in a plurality of embodiments individually or in any appropriate sub-combination. Furthermore, although features may operate in a specific combination and may be initially depicted as being claimed, one or more features of a claimed combination may be excluded from the combination in some cases, and the claimed combination may be changed into a sub-combination or a modification of the sub-combination.

Likewise, although operations are depicted in a specific order in the drawings, it should not be understood that the operations must be performed in the depicted specific order or sequential order or all the shown operations must be performed in order to obtain a preferred result. In a specific case, multitasking and parallel processing may be advantageous. In addition, it should not be understood that the separation of various device components of the aforementioned embodiments is required for all the embodiments, and it should be understood that the aforementioned program components and apparatuses may be integrated into a single software product or packaged into multiple software products.

The embodiments disclosed in the present specification and the drawings are intended merely to present specific examples in order to aid in understanding of the present disclosure, but are not intended to limit the scope of the present disclosure. It will be apparent to those skilled in the art that various modifications based on the technical spirit of the present disclosure, as well as the disclosed embodiments, can be made.

What is claimed is:

1. An anti-jamming time synchronization method comprising:

receiving a global positioning system (GPS) signal from a GPS satellite using an omnidirectional antenna;

receiving a satellite-based augmentation system (SBAS) signal from an SBAS satellite using a directional antenna;

calculating measurement values of the GPS signal and the SBAS signal;

decoding a GPS message of the GPS signal and an SBAS message of the SBAS signal;

when the measurement values are values within a normal range, synchronizing time with GPS time based on a measurement value of the GPS signal and the GPS message; and when the measurement values are values beyond the normal range, synchronizing time with the GPS time based on a measurement value of the SBAS signal and the SBAS message.

2. The anti-jamming time synchronization method of claim 1, wherein the synchronizing of the time with the GPS time based on the GPS message comprises:

identifying a location of the omnidirectional antenna using the measurement value of the GPS signal and the GPS message; and generating current time synchronized with the GPS time, a frequency synchronized with the GPS time, and a 1 pulse per second (1PPS) signal synchronized with the GPS time based on the location of the omnidirectional antenna.

3. The anti-jamming time synchronization method of claim 2, wherein the generating of the 1PPS signal synchronized with the GPS time comprises:

measuring a delay path between the omnidirectional antenna and a time synchronization generator configured to perform anti-jamming time synchronization; and correcting the current time synchronized with the GPS time according to the delay path.

4. The anti-jamming time synchronization method of claim 1, wherein the synchronizing of the time with the GPS time based on the SBAS message comprises:

reducing an strength of a signal transmitted in a direction in which the directional antenna is not directed, by selecting the directional antenna;

determining current time synchronized with the GPS time using the measurement value of the SBAS signal, the SBAS message, and a delay information according to a delay path between the directional antenna and a time synchronization generator configured to perform anti-jamming time synchronization; and generating a frequency synchronized with the GPS time and a 1PPS signal synchronized with the GPS time according to the current time synchronized with the GPS time.

5. The anti-jamming time synchronization method of claim 4, wherein the determining of the current time synchronized with the GPS time comprises:

determining transmission time information, satellite information, a satellite time error, ionospheric delay time, and tropospheric delay time based on the SBAS message;

determining time at which the SBAS signal is transmitted from the SBAS satellite based on the transmission time information;

determining a location of the SBAS satellite based on the time at which the SBAS signal is transmitted and the satellite information;

determining radio wave travel time based on the location of the SBAS satellite and a location of the directional antenna; and determining the current time based on the radio wave travel time, the ionospheric delay time, and the tropospheric delay time.

6. The anti-jamming time synchronization method of claim 5, further comprising:

determining the time at which the SBAS signal is transmitted with respect to GPS reference time by compensating for the time at which the SBAS signal is transmitted based on the satellite time error, wherein the determining of the location of the SBAS satellite comprises determining the location of the SBAS satellite based on the time at which the SBAS signal is transmitted and the satellite information with respect to the GPS reference time.

7. The anti-jamming time synchronization method of claim 5, wherein the satellite information comprises at least one of location information of the SBAS satellite, velocity information of the SBAS satellite, or acceleration information of the SBAS satellite.

8. The anti-jamming time synchronization method of claim 5, wherein the determining of the ionospheric delay time and the tropospheric delay time comprises:

determining an ionospheric delay time error from the location of the directional antenna to a direction in which the SBAS satellite is located, using ionospheric delay correction information included in the SBAS message; and determining a tropospheric delay time error from the location of the directional antenna to the direction in which the SBAS satellite is located, using tropospheric delay correction information included in the SBAS message.

9. The anti-jamming time synchronization method of claim 5, wherein the determining of the time at which the SBAS signal is transmitted comprises determining the time at which the SBAS signal is transmitted using the transmission time information included in the SBAS message to number of bits, number of pieces of codes, number of chips, code, and a carrier phase value.

10. The anti-jamming time synchronization method of claim 1, wherein the measurement values comprise at least one of a pseudo range of the GPS signal, Doppler of the GPS signal, a carrier phase value of the GPS signal, a signal-to-noise ratio of the GPS signal, a pseudo range of the SBAS signal, Doppler of the SBAS signal, a carrier phase value of the SBAS signal, or a signal-to-noise ratio of the SBAS signal.

11. An anti-jamming time synchronization apparatus comprising:

an omnidirectional antenna configured to receive a global positioning system (GPS) signal from a GPS satellite;

a directional antenna configured to receive a satellite-based augmentation system (SBAS) signal from an SBAS satellite; and a time synchronization generator, wherein the time synchronization generator is configured to:

calculate measurement values of the GPS signal and the SBAS signal;

decode a GPS message of the GPS signal and an SBAS message of the SBAS signal;

when the measurement values are values within a normal range, synchronize time with GPS time based on a measurement value of the GPS signal and the GPS message; and when the measurement values are values beyond the normal range, synchronize time with GPS time based on a measurement value of the SBAS signal and the SBAS message.

12. The anti-jamming time synchronization apparatus of claim 11, further comprising:

a switch configured to control a reception path through which the GPS signal from the omnidirectional antenna and the SBAS signal the directional antenna are transmitted to the time synchronization generator, wherein the time synchronization generator is further configured to, when the measurement values of the GPS signal are values beyond the normal range, request the switch to control the reception path to receive only the SBAS signal transmitted from the directional antenna.

13. The anti-jamming time synchronization apparatus of claim 12, wherein the time synchronization generator is further configured to:

when the measurement values of the GPS signal are values beyond the normal range, determine current time synchronized with the GPS time using the measurement value of the SBAS signal, the SBAS message, and a delay information according to a delay path between the directional antenna and the time synchronization generator configured to perform anti-jamming time synchronization; and generate a frequency synchronized with the GPS time and a 1 pulse per second (1PPS) signal synchronized with the GPS time based on the current time synchronized with the GPS time.

14. The anti-jamming time synchronization apparatus of claim 13, wherein the time synchronization generator is further configured to:

determine transmission time information, satellite information, a satellite time error, ionospheric delay time, and tropospheric delay time based on the SBAS message;

determine time at which the SBAS signal is transmitted from the SBAS satellite based on the transmission time information;

determine a location of the SBAS satellite based on the time at which the SBAS signal is transmitted and the satellite information;

determine radio wave travel time based on the location of the SBAS satellite and a location of the directional antenna; and determine the current time based on the radio wave travel time, the ionospheric delay time, and the tropospheric delay time.

15. The anti-jamming time synchronization apparatus of claim 14, wherein the time synchronization generator is further configured to:

determine GPS reference time by compensating for the time at which the SBAS signal is transmitted based on the satellite time error; and determine the location of the SBAS satellite based on the GPS reference time and the satellite information.

16. The anti-jamming time synchronization apparatus of claim 14, wherein the time synchronization generator is further configured to:

determine an ionospheric delay time error from the location of the directional antenna to a direction in which the SBAS satellite is located, using ionospheric delay correction information included in the SBAS message; and determine a tropospheric delay time error from the location of the directional antenna to the direction in which the SBAS satellite is located, using tropospheric delay correction information included in the SBAS message.

17. The anti-jamming time synchronization apparatus of claim 14, wherein the time synchronization generator is further configured to determine the time at which the SBAS signal is transmitted using the transmission time information included in the SBAS message to a number of bits, a number of pieces of codes, a number of chips, code, and a carrier phase value.

18. The anti-jamming time synchronization apparatus of claim 11, wherein the time synchronization generator is further configured to:

when the measurement values are values within the normal range, identify a location of the omnidirectional antenna using the measurement value of the GPS signal and the GPS message; and generate current time synchronized with the GPS time, a frequency synchronized with the GPS time, and a 1PPS signal synchronized with the GPS time based on the location of the omnidirectional antenna.

19. The anti-jamming time synchronization apparatus of claim 11, wherein the measurement values comprise at least one of a pseudo range of the GPS signal, Doppler of the GPS signal, a carrier phase value of the GPS signal, a signal-to-noise ratio of the GPS signal, a pseudo range of the SBAS signal, Doppler of the SBAS signal, a carrier phase value of the SBAS signal, or a signal-to-noise ratio of the SBAS signal.

* * * * *